(12) United States Patent
Meek (10) Patent No.: US 6,182,006 B1
(45) Date of Patent: Jan. 30, 2001

(54) NAVIGATION SYSTEM REMOTE CONTROL UNIT WITH DATA CADDY FUNCTIONALITY

(75) Inventor: James A. Meek, Palatine, IL (US)

(73) Assignee: Navigation Technologies Corporation, Rosemont, IL (US)

( * ) Notice: Under 35 U.S.C. 154(b), the term of this patent shall be extended for 0 days.

(21) Appl. No.: 09/324,075

(22) Filed: Jun. 1, 1999

(51) Int. Cl.$^7$ .................................................. G01C 21/00
(52) U.S. Cl. ........................ 701/200; 701/208; 701/210; 701/213; 340/988; 340/990; 340/995
(58) Field of Search ................................... 701/200, 208, 701/210, 213, 216, 217; 340/988, 990, 995

(56) References Cited

U.S. PATENT DOCUMENTS

| | | | |
|---|---|---|---|
| 5,614,898 | 3/1997 | Kamiya et al. | 340/995 |
| 5,619,515 | 4/1997 | Hayama | 371/48 |
| 5,638,280 | 6/1997 | Nishimura et al. | 364/499 B |
| 5,751,228 | 5/1998 | Kamiya et al. | 340/988 |
| 5,911,582 * | 6/1999 | Redford et al. | 434/307 R |
| 6,055,478 * | 4/2000 | Heron | 701/213 |

* cited by examiner

Primary Examiner—William A. Cuchlinski, Jr.
Assistant Examiner—Arthur D. Donnelly
(74) Attorney, Agent, or Firm—Frank J. Kozak; Lawrence M. Kaplan

(57) ABSTRACT

An improved remote control unit for an in-vehicle navigation system and methods for use thereof. The improved remote control unit includes a re-writable data storage memory and a data reception interface through which data from an external computing device can be transmitted to the remote control unit and stored in the re-writable data storage memory. The remote control unit also includes appropriate programming that provides for receiving data from an external computing device, storing the data in the re-writable data storage memory, and then transmitting the stored data from the re-writable data storage memory to the in-vehicle navigation system from a data transmission interface of the improved remote control unit. The improved remote control unit can also be used to transfer data from the in-vehicle navigation system to an external computing device. In one embodiment, the data reception interface is implemented by replacing the uni-directional infrared transmitter of a conventional remote control unit with a bi-directional infrared interface capable of both transmitting and receiving data.

21 Claims, 6 Drawing Sheets

NAVIGATION SYSTEM REMOTE CONTROL UNIT WITH DATA CADDY FUNCTIONALITY

BACKGROUND OF THE INVENTION

The present invention relates to a remote control unit for a navigation system and more particularly, the present invention relates to a remote control unit for a navigation system, wherein the remote control unit includes a data storage memory that enables the remote control unit to be used to caddy data between an external computing device and the navigation system and vice versa.

In-vehicle navigation systems are available that provide end-users (such as drivers of vehicles in which the navigation systems are installed) with various navigation-related features. Included among the features provided by some navigation systems are route calculation, route guidance, map display, and electronic yellow pages, as well as other features. Although in-vehicle navigation systems provide many useful and important features, many navigation systems are designed as dedicated systems tailored to interact with other computer systems in limited and defined ways.

Some users of navigation systems have the need to exchange data between external computing devices and their navigation systems. For example, salespersons who use their vehicles to visit actual or potential customers may want to input customer lists from their personal computers into their navigation systems in order to use their navigation systems to calculate routes to visit the customers. By integrating customer list data with a navigation system, it may be possible to minimize travel times, facilitate dining and travel arrangements, avoid rush hour traffic, etc.

Some navigation systems allow data to be input into the navigation system by means of flash memory cards or similar devices. Although flash memory cards work well for this purpose, there exists room for improvements. First of all, in order to use a flash memory card to transfer data into a navigation system from an external computer, the external computer is required to be equipped with a compatible flash memory card connector. This kind of connector is relatively rare. Another potential disadvantage is that flash memory card connectors are relatively fragile and may become dirty over time.

Various other approaches have been proposed that would enable in-vehicle navigation systems to receive data from external computing devices. For example, systems have been proposed that use cellular telephone communications systems to deliver email, traffic report data, etc., to in-vehicle navigation systems. Some of these systems may be able to provide for the simple exchange of data between a computer and an in-vehicle navigation system. However, some of these proposed systems require significant infrastructure development and associated costs and complexity. Also, some of these systems may not be available in all geographic areas.

Accordingly, there exists a need for a relatively simple and inexpensive way to allow an in-vehicle navigation system to receive data from another computing device. Further, there also exists a need for a relatively inexpensive way for an in-vehicle navigation system and another computing device to exchange data quickly, reliably, and securely.

SUMMARY OF THE INVENTION

To address the above concerns, the present invention includes an improved remote control unit for an in-vehicle navigation system and methods for use thereof. The improved remote control unit includes a re-writable data storage memory and a data reception interface through which data from an external computing device can be transmitted to the remote control unit and stored in the re-writable data storage memory. The remote control unit also includes appropriate programming that provides for receiving data from the external computing device, storing the data in the re-writable data storage memory, and then transmitting the stored data from the re-writable data storage memory to the in-vehicle navigation system from a data transmission interface of the improved remote control unit. The improved remote control unit can also be used to transfer data from the in-vehicle navigation system to an external computing device. In one embodiment, the data reception interface is implemented by replacing the uni-directional infrared transmitter of a conventional remote control unit with a bi-directional infrared interface capable of both transmitting and receiving data.

According to one aspect, the improved remote control unit is used to transfer data about desired destinations from the external computing device to the in-vehicle navigation system so that the in-vehicle navigation system can use the data about the desired destinations to calculate routes, etc.

According to another aspect, the improved remote control unit is used to transfer expense-related data from the in-vehicle navigation system to an external computing device.

DETAILED DESCRIPTION OF THE PRESENTLY PREFERRED EMBODIMENTS

Figure 1:
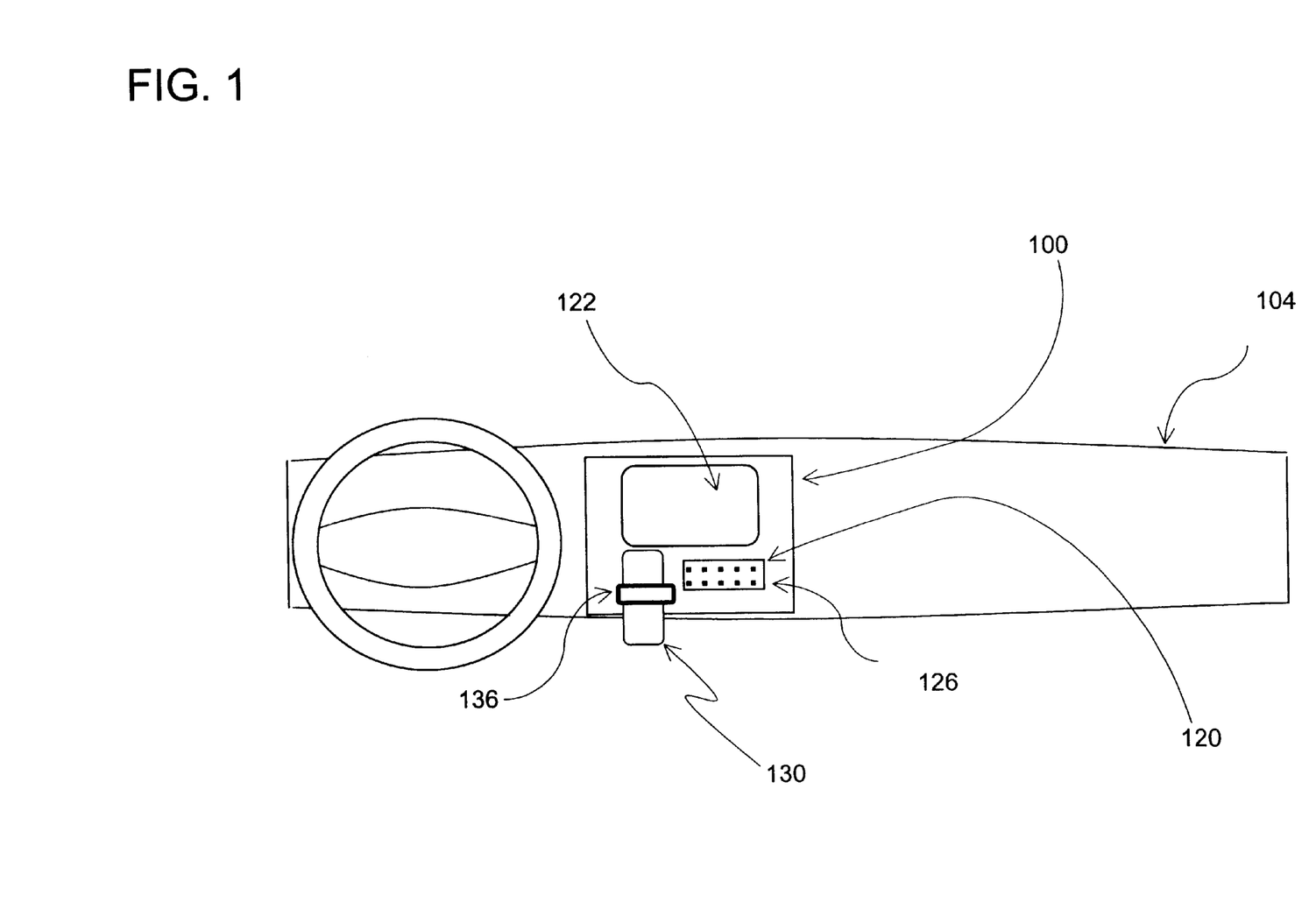
FIG. 1 is an illustration of an in-vehicle navigation system installed in a dashboard of a vehicle.
Figure 2:
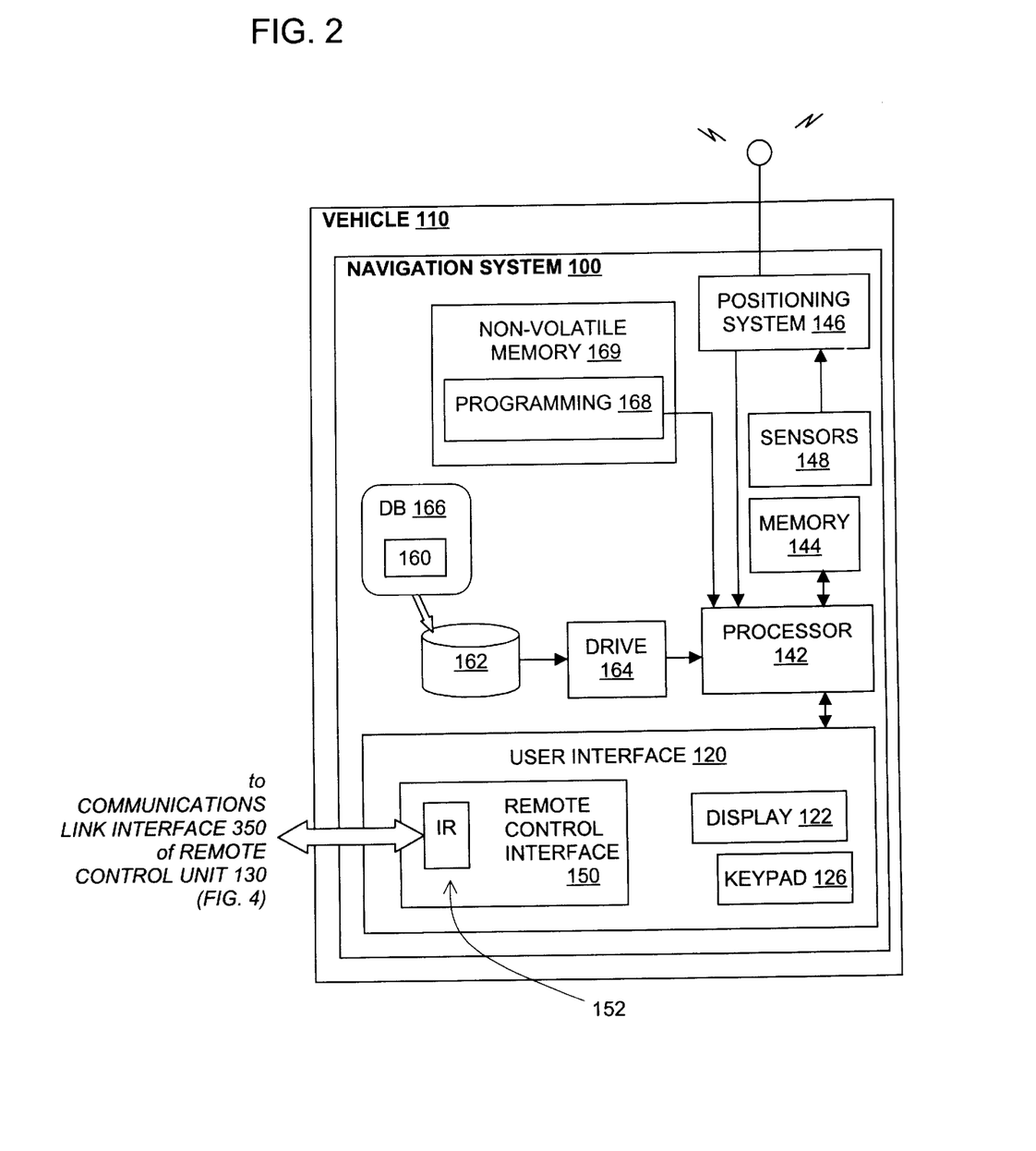
FIG. 2 is a block diagram showing components of the navigation system in FIG. 1.
Figure 5:
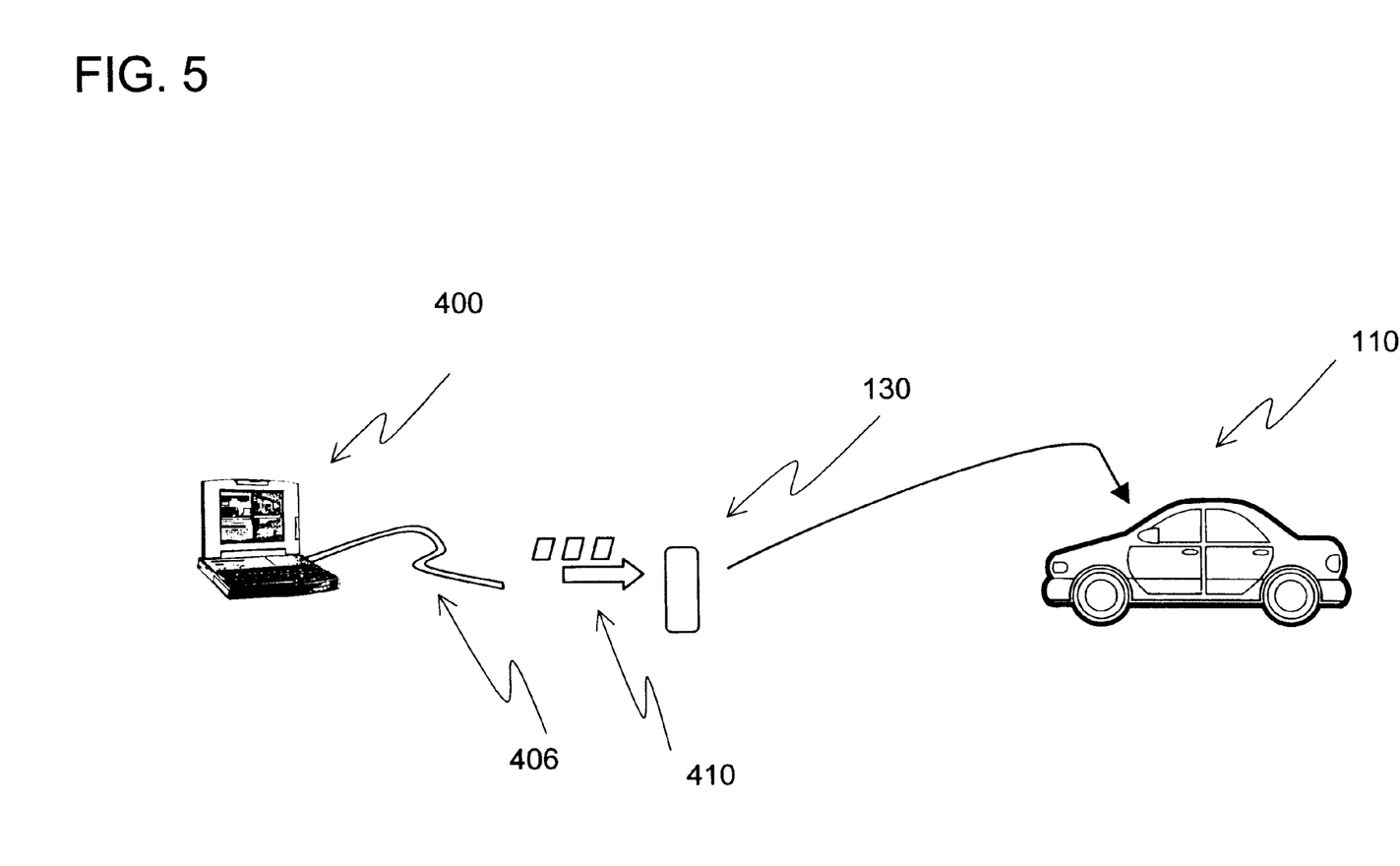
FIG. 5 is an illustration of the remote control unit of FIG. 2 used to transfer data between a portable computer and the vehicle in which the in-vehicle navigation system of FIG. 1 is installed.

Referring to FIG. 1, there is an illustration of a navigation system 100 installed in a dashboard 104 of a vehicle (shown at 110 in FIGS. 2 and 5). The navigation system 100 includes a user interface 120, including a display screen 122 and an input keypad 126. As part of the user interface 120, the navigation system includes a remote control unit 130. The remote control unit 130 is preferably mounted in a bracket 136 (or other holding device) located on a front panel of the navigation system 100. Alternatively, the bracket 136 (or other holding device) may be located elsewhere within reach manually of a driver of the vehicle in which the navigation system 100 is installed. For example, the remote control unit and/or the bracket may be mounted elsewhere on the dashboard. In another alternative, the remote control unit 130 may not be physically mounted inside the vehicle, but may be otherwise located close to the driver. For example, the remote control unit 130 may be held or worn by the driver.

The remote control unit 130 is removable from the vehicle 110. The remote control unit 130 may be physically removed from the bracket 136 (or other holding device), if present, so that the driver or other person can hold the remote control unit 130 in his/her hand and take the remote control unit 130 out of the vehicle 110.

FIG. 2 is a block diagram showing components of the embodiment of the navigation system 100 shown in FIG. 1. The navigation system 100 is located in the vehicle 110. The vehicle 110 may be an automobile, truck, bus, etc. In other embodiments, the navigation system 100 may be installed in other platforms. The navigation system 100 is a combination of hardware and software components. The hardware components of the navigation system 100 may include a processor 142, memory 144, and so on.

In the embodiment of FIG. 2, the navigation system 100 also includes positioning system hardware 146. The positioning system hardware 146 collects data used to determine the position of the vehicle 110 in which it is installed. The positioning system hardware 146 may include sensors 148 or other components that sense the speed, orientation, direction, and so on, of the vehicle 110. The positioning system hardware 146 may also include a GPS system.

As stated above, the user interface 120 is part of the navigation system 100. The user interface 120 includes a means for receiving instructions and/or input from an end user of the navigation system 100. For example, the user interface 120 includes the input keypad 126. The user interface 120 may also include other input hardware and software, such as a microphone, voice recognition software, and so on, through which the driver (or other end user) can request navigation information. The user interface 120 also includes a means for providing information back to the end user. Information may be provided back to the end user through the display 122. The user interface 120 may also include other output hardware and software, such as speakers, speech synthesis software, etc., through which the driver can be provided with information from the navigation system 100.

As shown in FIG. 2, the user interface 120 includes a remote control interface 150. The remote control interface 150 provides for a communications link between the navigation system 100 and the remote control unit 130. In one present embodiment, the remote control interface 150 provides for a bi-directional wireless exchange of data between the navigation system 100 and the remote control unit 130. In this embodiment, the remote interface 150 includes a port 152. In a present embodiment, the port 152 may be an infrared port, but alternatively, the port 152 may be implemented using other data transfer means, such as RF, optical, etc.

In order to provide navigation features to an end user, the navigation system 100 uses geographic data 160. The geographic data 160 may be stored in the vehicle 110 or alternatively, the geographic data 160 may be stored remotely and made available to the navigation system 100 in the vehicle 110 through a wireless communication system which may be part of the navigation system 100. In another alternative, a portion of the geographic data 160 may be stored in the vehicle 110 and a portion of the geographic data 160 may be stored in a remote location and made available to the navigation system 100 in the vehicle 110 over a wireless communication system from the remote location. As shown in FIG. 2, some or all of the geographic data 160 is stored on a medium 162 which is located in the vehicle 110. Accordingly, the navigation system 100 includes a drive 164 (or other suitable peripheral device) into which the medium 162 can be installed and accessed.

In one embodiment, the storage medium 162 is a CD-ROM. In another alternative embodiment, the storage medium 162 may be a PCMCIA card in which case the drive 164 would be substituted with a PCMCIA slot. Various other storage media may be used, including fixed or hard disks, DVD disks or other currently available storage media, as well as storage media that may be developed in the future.

The geographic data 160 may be in the form of one or more computer-readable data files or databases 166. The geographic data 160 includes information about the roads and intersections in or related to one or more geographic regions or coverage areas. This information includes data specifying the positions of the roads in the covered geographic region and also includes data about features relating to the roads, such as restrictions on directions of travel on the roads (e.g., one-way streets), turn restrictions, street addresses, street names, speed limits, and so on. The geographic data 160 may also include information about points of interest in the geographic area, such as hotels, restaurants, museums, stadiums, offices, automobile dealerships, auto repair shops, etc. The geographic data 160 may also include information about places, such as cities, towns, or other communities. The geographic database 166 may include other data about the geographic region.

In addition to the hardware components and geographic database, the navigation system 100 includes programming 168. The programming 168 includes the software that provides for the functions and/or features performed by the navigation system 100. The programming 168 uses the geographic data 160 in conjunction with input from the driver (or passenger) via the user interface 120, and possibly in conjunction with outputs from the positioning system 146, to provide various features and/or functions.

The programming 168 may be stored in a non-volatile storage medium 169 in the navigation system 100. Alternatively, the programming 168 and the geographic data 160 may be stored together on a single storage device or medium. Alternatively, the programming 168 may be located at a remote location and may be provided to or accessed by the navigation system 100 over a communications system.

The programming 168 may be formed of separate component applications (also referred to as programs, subprograms, routines, or tools). The component applications of the navigation programming 168 may work together through defined programming interfaces. In one embodiment, the programming 168 is written in C although in alternative embodiments other programming languages may be used, such as C++, Java, Visual Basic, and so on.

In the embodiment of FIG. 2, the programming 168 provides for functions that use the geographic data 160. The features provided by the programming 168 may include route calculation, map display, route guidance, and other features. The programming 168 also supports the positioning system 146 and the user interface 120. These user interface functions in the programming 168 may provide for presenting a menu to the driver on the screen 122, accepting inputs from the driver via the keypad 126, displaying results to the driver on the display 122, and so on. The user interface functions in the programming 168 also support the communications link with the remote control unit 130 provided by the remote control interface 150.

Figure 3:
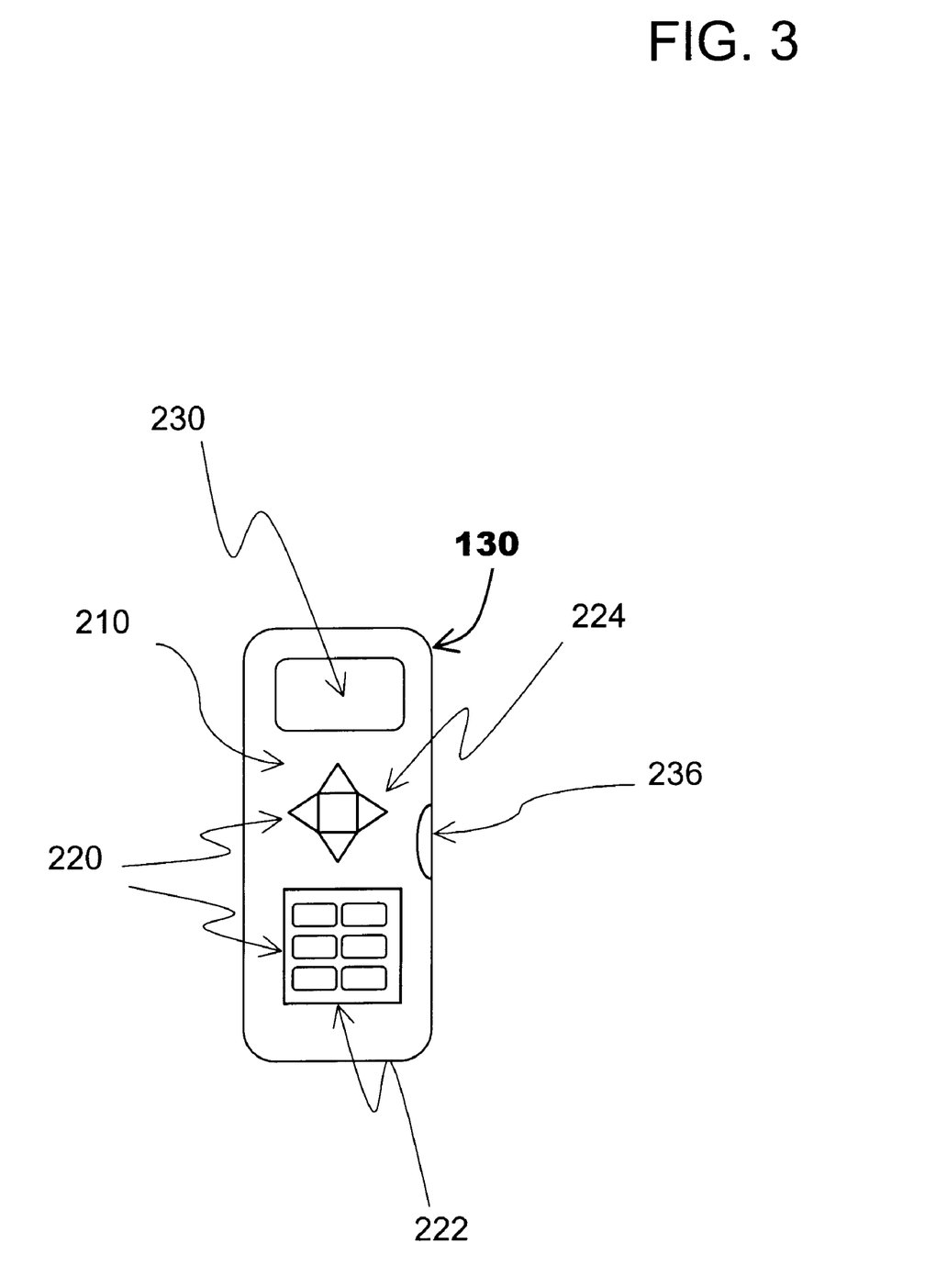
FIG. 3 is a depiction of the remote control unit shown in FIG. 1.

Referring to FIG. 3, there is a depiction of one embodiment of the remote control unit 130, shown in FIG. 1. In FIG. 3, the remote control unit 130 is shown to include a housing 210 having a generally rectangular shape. The housing 210 is sized so that a person, such as the driver of the vehicle, can hold the remote control 130 unit in his/her hand. The housing 210 is approximately 5 inches in height, 2 inches wide, and has a depth of approximately 1 inch. These dimensions are approximate and the size of the housing 210 can vary.

Located on the front of the housing 210 is a remote control user interface 220. The remote control user interface 220 provides a means by which a person can manually enter commands into the remote control unit 130. The remote control user interface 220 may include a keypad 222, a toggle 224, buttons, etc. for this purpose.

The remote control unit 130 may also include a display 230. If provided, the display 230 may be located on the front of the housing 210 so that it can be observed by the user. The display 230 may be formed of an LCD or other flat display panel technology. The display 230 may show menu options which can be used in conjunction with the keypad 222 and toggle 224 to enter commands into the remote control unit. The display 230 is optional and may be omitted.

The remote control unit 130 includes a communication port 236. The communication port 236 is located on the housing 210. The communications port 236 may be located on the back side of the housing 210 (i.e., the side opposite the user interface 220), or alternatively, the communications port 236 may be located on a side or front of the housing 210. The communications port 236 is located on the housing 210 of the remote control unit 130 so that it can communicate with the port 152 of the remote control interface 150 of the navigation system 100 (in FIG. 2), when the remote control unit 130 is positioned in the bracket 136 (in FIG. 1). The communications port 236 is implemented so that it is compatible with the technology of the remote control interface 150 of the navigation system 100. Accordingly, the communications port 236 may be implemented using infrared, RF, optical, etc. In a preferred embodiment, the communications port 236 is a bi-directional infrared port. Bi-directional infrared ports (or links) are widely available on personal computers, personal digital assistants and other computing devices and appliances. Including a bi-directional infrared port in the remote control unit enables the remote control unit 130 to exchange data with all these other kinds of devices.

Figure 4:
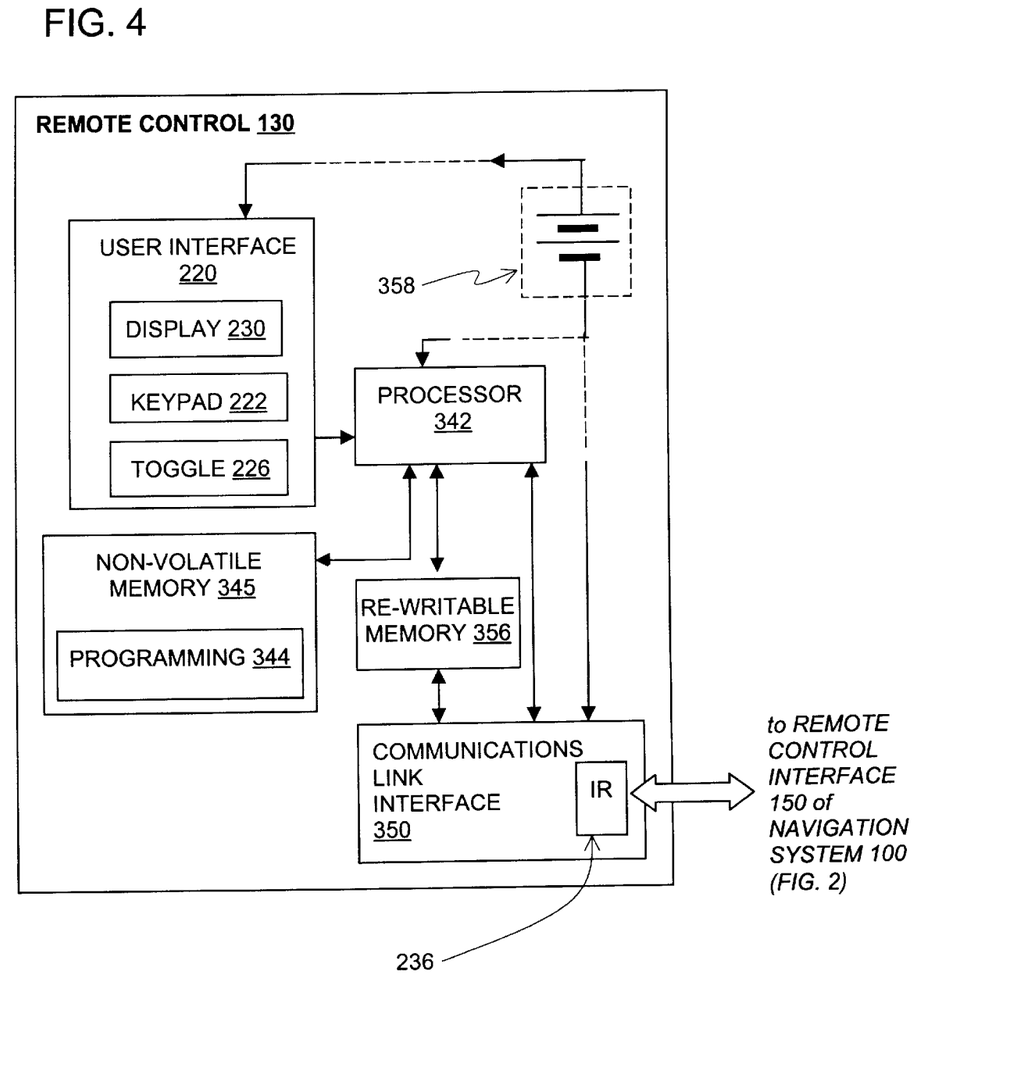
FIG. 4 is a block diagram illustrating components of the remote control unit of FIG. 2.

Referring to FIG. 4, there is a block diagram of the components of the remote control unit 130 of FIG. 3. Some of all the components shown in FIG. 4 are located in or on the housing 210 of the remote control unit 130 (shown in FIG. 3). The remote control unit 130 is a combination of hardware and software components. The remote control unit 130 includes a processor 342 and programming 344. The programming 344 may be stored in a non-volatile memory 345 located in the remote control unit 130. The processor 342 and programming 344 support the functions of the hardware of the user interface 220, including the keypad, 222, the toggle 226, and the display 230. The processor 342 and programming 344 also support a communications link interface 350. The communications link interface 350 includes the communication port 236. The communications link interface 350 includes technology that is compatible with the remote control interface 150 in the navigation system 100.

Included in the remote control unit 130 is a re-writable memory 356. The re-writable memory 356 is coupled to the processor 342 and the communications link interface 350. The re-writable memory 356 is preferably provided by relatively inexpensive memory modules. In one embodiment, the re-writable memory 356 includes 4M of memory, but alternatively, the re-writable memory 356 may include less or more memory, such as 8M, 16M, 32M, or more.

Because the remote control unit 130 is portable and can be carried out of the vehicle, the remote control unit 130 includes a standalone energy source 358. The standalone energy source may be implemented by any suitable means, such as one or more batteries. The batteries may be rechargeable. The energy source 358 is coupled to any of the components in the remote control unit 358 that require power. For example, the energy source 358 may be coupled to the user interface 220, the processor 342, and the communications link interface 350. The energy source 358 may also be coupled to the memories 345 and 356.

The programming 344 in the remote control unit 130 includes functions that support the use of the remote control unit 130 as a data conveyance device (or "data caddy"). More specifically, the programming 344 in the remote control unit 130 includes functions that provide for receiving data from another computing device into the remote control unit 130 via the communications link interface 350. The programming 344 also provides for storing in the re-writable memory 356 the data received from another computing device via the communications link interface 350. The programming 344 also provides for extracting stored data from the re-writable memory 356 and transmitting the extracted data via the communications link 350 of the remote control unit 130 to the navigation system 100 via the remote control interface 150 thereof.

The programming 344 in the remote control unit 130 may also provide for additional features. For example, the programming 344 may provide for error-checking that confirms and assures the integrity of the data that has been received via the communications link interface 350 and stored in the re-writable memory 356. The programming 344 also assures that sufficient memory capacity exists to store received data. The programming 344 also provides for erasing or freeing up memory from which data has been successfully transferred. The programming 344 also prevents writing over any existing data that has not yet been transferred out of the memory. The programming 344 may also provide warnings to the user if errors are detected in the transmission of data, if errors are detected in the storage of data, if the memory capacity of remote control unit is full, if the battery is low, if the file format is incompatible, etc. The programming 344 may provide for features in addition to those mentioned above.

FIG. 5 is an illustration that shows how the remote control unit 130 can be used to transfer data from another computing device 400 into the navigation system installed in the vehicle 110. The other computing device 400 may be a personal computer, such as a notebook computer, a desktop computer, a Palm-Pilot®-type device, or other type of device. The other computing device 400 includes a communications port 406 that is compatible with the communications link (350 in FIG. 4) of the remote control unit 130. In one embodiment, the communications port 406 of the other computing device 400 is implemented by an IR port. The IR port may be attached as a peripheral device with cabling to a serial port or a USB (universal serial bus) port of the computing device 400. Alternatively, the IR port may be built into the external computing device 400.

The remote control unit 130 is removed from the vehicle 110 and brought into proximity with the communications port 406 of the external computing device 400. For example, the external computing device 400 may be located in a person's office. The remote control unit 130 is brought into the person's office next to the communications port 406 of the external computing device 400.

When being used to transfer data from the external computing device 400 to the remote control unit 130, programming is run on the external computing device 400 to output data via the communications port 406. The programming on the external computing device 400 used for this purpose may be part of an application or alternatively may be part of the operating system of the external computing device 400. The data 410 from the external computing device 400 is transferred to the remote control unit 130. After data is transferred from the external computing device 400 to the remote control unit 130 (as described in more detail below), the remote control unit 130 is carried by the driver or other person back to the vehicle 110. When the remote control unit is brought back to the vehicle 110, it is re-installed in the bracket (136 of FIG. 1) of the navigation system or otherwise brought into proximity with the remote control interface (150 of FIG. 1) of the navigation system 110. When the remote control unit is in proximity to the remote control interface of the navigation system, it is operated to transfer the data from the re-writable memory (356 in FIG. 4) of the remote control unit to the navigation system. After the data from the remote control unit has been uploaded to the navigation system, the navigation system can use the data for various functions.

After the data from the remote control unit has been uploaded to the navigation system, the remote control unit can then be used to transfer data again from the same external computing device (or a different external computing device) to the navigation system. The remote control unit may also be used to transfer data from the navigation system to an external computing device.

Figure 6:
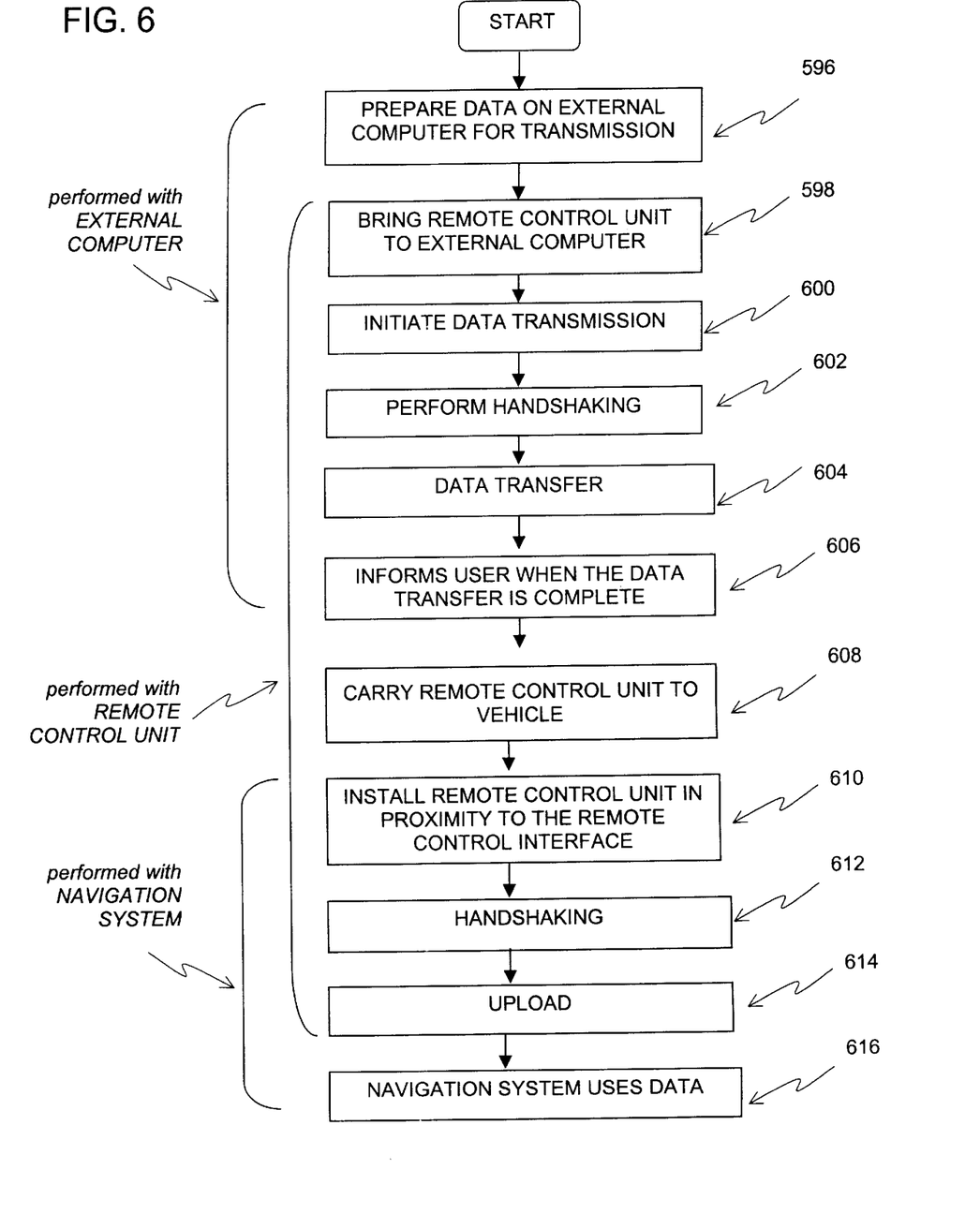
FIG. 6 is a flow chart illustrating the steps performed in an exemplary use of the remote control unit of FIG. 5 to caddy data between an external computer and a navigation system.

FIG. 6 shows steps performed during an exemplary use of the remote control unit as a data caddy. Programming on an external computer (e.g., computer 400 in FIG. 5) is operated to prepare data for transmission to the remote control unit 130 (Step 596). This preparation may involve saving the data in a particular format or in a particular directory or folder on the external computer. The remote control unit 130 is physically brought into proximity with the external computer (Step 598). Programming on the external computer is operated to initiate a transmission of data from the IR port of the external computer to the remote control unit (Step 600). The programming on the external computer and the programming (344 in FIG. 4) of the remote control unit perform necessary handshaking to establish a communications link (Step 602). A data transfer procedure is undertaken and the external computer transmits data from its communications port (406 in FIG. 5) to the communications link interface (350 in FIG. 4) of the remote control unit (Step 604). An application on the external computer may inform the end user when the data transfer is complete (Step 606). The end user physically carries the remote control unit to the vehicle (Step 608) and installs the remote control unit in proximity to the remote control interface (150 in FIG. 2) of the navigation system (Step 610). When brought into proximity with the navigation system remote control interface (150 in FIG. 2), the programming in the remote control unit and the programming in the navigation system perform appropriate handshaking (Step 612). After performing the handshaking, the data from the external computer that had been stored in the re-writable memory of the remote control unit is uploaded into the navigation system (Step 614). After the data transfer is complete, the navigation system uses the data (Step 616).

Other Applications

The use of the remote control unit as a data caddy for a navigation system can be incorporated into various kinds of applications.

In one application, a person uses software on his/her personal computer to identify a plurality of locations to be visited. The locations may be business offices of customers, for example. The programming on the personal computer generates a list of the locations to be visited. The programming on the personal computer outputs data representing the list of locations to the remote control unit. The remote control unit stores the data representing the list of locations in the re-writable memory. The remote control unit is carried to the navigation system by the driver and the data representing the list of locations is uploaded from the remote control unit into the navigation system. The navigation system uses the list of locations to calculate a route through all the locations on the list. The order in which the locations are visited may be determined by the programming in the navigation system, or alternatively, the order in which the locations are visited may be constrained to the order and/or times specified by programming on the personal computer. The programming on the personal computer used to generate a list of places to visit may be conventional programs, such Microsoft Outlook or Microsoft Access. Other programs may be used.

In another application, the remote control unit is used to caddy data from the navigation system back to another computing device. For example, a person who uses his/her car for business may wish to extract data regarding travel mileage, tolls, parking, expenses, a list of destinations visited, etc., from the navigation system into an expense report prepared on a personal computer. The remote control unit may be used to receive data from the navigation system, store the data in the re-writable memory of the remote control unit, and then upload the data to another computing device, such as a notebook computer. The data may be used in expense reports, spreadsheets, databases, etc.

In still another application, the remote control unit can be used to caddy data from the navigation system in one vehicle to a navigation system in another vehicle. For example, some in-vehicle navigation systems allow a traveler to store data in the in-vehicle navigation system about preferred routes, driver preferences, etc. These preferences can be transferred from the in-vehicle navigation system in one vehicle to a re-writable memory in a remote control unit and then loaded into the in-vehicle navigation system in another vehicle. In this manner, a traveler who uses different vehicles (e.g. from a fleet or from a rental car agency) on a regular basis can easily transfer his/her preferences from one vehicle to another vehicle. In this alternative, the traveler may have a personal remote control unit which he/she carries with him/her from vehicle to vehicle.

As demonstrated by the foregoing, using the remote control unit of a navigation system as a data caddy enables the exchange of data between applications on external computing devices and an in-vehicle navigation system. This can provide significant advantages. Using the remote control unit of the navigation system for this purpose is easier, less expensive, and more reliable than other ways to exchange data.

Other Alternatives

In alternative embodiments, the navigation system and the remote control unit may exchange data by means other than a wireless communications link. For example, the navigation system and the remote control unit may exchange data by means of cabling and/or a direct hardware connection, such as a USB connection.

In one embodiment described above, the remote control unit included a bi-directional infrared communications link. In an alternative embodiment, the remote control unit may include separate communications interfaces for inbound and outbound data transfers. One communications interface may be used to transmit data out of the remote control unit and the other communications interface may be used to receive data into the remote control unit. In still another embodiment, the remote control unit may support multiple types of communications links. These multiple communications links may include wireless links, such as IR, RF, etc., as well as cable links, such as USB. For example, a USB cable link may be used to connect the remote control unit to a personal computer to receive data therefrom. Then, the IR port on the remote control unit may be used to transmit the stored data to the in-vehicle navigation system.

It is intended that the foregoing detailed description be regarded as illustrative rather than limiting and that it is understood that the following claims including all equivalents are intended to define the scope of the invention.

I claim:

1. An improved remote control unit for a navigation system, wherein the navigation system is installed in a vehicle and wherein said improved remote control unit comprises:
    a housing removable from said vehicle and having a size suitable for holding in a hand of a driver of said vehicle;
    an energy supply mounted in said housing;
    a user interface located on said housing by which the driver can manually input commands for control of said navigation system;
    a data transmission interface located on said housing by which data signals embodying the commands input by the driver are transmitted from said housing to a data input port on said navigation system wherein said data transmission interface is coupled to receive energy for operation thereof from said energy supply;
    a re-writable data storage memory located in said housing;
    a data reception interface located on said housing through which data from an external computing device other than the navigation system can be input into said re-writable memory; and
    programming stored within said housing providing for operating the data reception interface to receive data therefrom for temporary storage in said re-writable data storage memory and transmission therefrom via said data transmission interface.

2. The invention of claim 1 wherein said remote control unit is removably mountable in a bracket located in said vehicle adjacent to said navigation system installed therein.

3. The invention of claim 1 wherein said data transmission interface of said remote control unit is a wireless interface.

4. The invention of claim 1 wherein said data transmission interface of said remote control unit is an infrared interface.

5. The invention of claim 1 wherein said data transmission interface and said data reception interface of said remote control unit are parts of a bi-directional interface of said remote control unit.

6. The invention of claim 5 wherein said bi-directional interface of said remote control unit is an infrared interface.

7. A remote control unit for a navigation system, wherein said navigation system is installed in a vehicle, said remote control unit comprising:
    a housing removable from said vehicle and having a size suitable for holding in a hand of a driver of said vehicle;
    a user interface located on said housing by which the driver can manually input commands for control of said navigation system;
    a re-writable data storage memory located in said housing;
    a bi-directional signaling interface located on said housing by which data embodying said commands input by the driver are transmitted from said housing to a data input port on said navigation system and through which data from another computing device can be input into said re-writable data storage memory; and
    programming stored within said housing and providing for operating the bi-directional signaling interface to receive data therethrough for temporary storage in said re-writable data storage memory and transmission therefrom via said bi-directional signaling interface.

8. The invention of claim 7 further comprising:
    an energy supply mounted in said housing; and wherein said bi-directional signaling interface is coupled to receive energy for operation thereof from said energy supply.

9. The invention of claim 7 wherein said bi-directional interface is an infrared interface.

10. A method of transferring data from an external computing device to an in-vehicle navigation system comprising:
    removing a remote control unit of said in-vehicle navigation system from a vehicle in which said in-vehicle navigation system is installed;
    coupling a data port of the remote control unit to an external computing device located outside the vehicle;
    transmitting data from the external computing device to the remote control unit;
    storing the transmitted data in a re-writable memory of the remote control unit;
    conveying the remote control unit back to the vehicle; and
    transmitting the data stored in the re-writable memory of the remote control unit to the in-vehicle navigation system.

11. The method of claim 10 wherein said steps of transmitting data from the external computing device and transmitting data to the in-vehicle navigation system are performed using infrared signals.

12. The method of claim 10 wherein said steps of transmitting data from the external computing device and transmitting data to the in-vehicle navigation system are performed through a bi-directional interface of said remote control unit.

13. The method of claim 10 further comprising the steps of:
    after the step of transmitting the data stored in the re-writable memory of the remote control unit to the in-vehicle navigation system, removing the remote control unit from the vehicle again;
    coupling the data port of the remote control unit to the external computing device located outside the vehicle again;
    transmitting data from the external computing device and the remote control unit again; and
    storing the data transmitted again in the re-writable memory of the remote control unit again including the step of writing over data previously stored in the re-writable memory.

14. The method of claim 13 further comprising the steps of:

after the step of storing the data transmitted again in the re-writable memory of the remote control unit again, conveying the remote control unit back to the vehicle again; and transmitting the data stored again in the re-writable memory of the remote control unit to the in-vehicle navigation system.

15. The method of claim 10 further comprising the step of:

after the step of removing a remote control unit of said in-vehicle navigation system, carrying the remote control unit from the vehicle to the external computing device.

16. The method of claim 10 wherein the data transmitted from the external computing device to the remote control unit represents desired destinations.

17. A method of transferring data from an in-vehicle navigation system to an external computing device comprising:

transmitting data from the in-vehicle navigation system to a remote control unit of said in-vehicle navigation system;

storing the transmitted data in a re-writable memory of the remote control unit;

removing the remote control unit from a vehicle in which said in-vehicle navigation system is installed;

coupling a data port of the remote control unit to an external computing device located outside the vehicle; and transmitting the data stored in the re-writable memory of the remote control unit to the external computing device.

18. The method of claim 17 further comprising:

after the step of transmitting the data stored in the re-writable memory of the remote control unit to the external computing device, conveying the remote control unit back to the vehicle.

19. The method of claim 17 wherein the data transmitted from the in-vehicle navigation system to the remote control unit includes expense-related data.

20. The method of claim 17 wherein said steps of transmitting data from the in-vehicle navigation system and transmitting data to the external computing device are performed using infrared signals.

21. The method of claim 17 wherein said steps of transmitting data from the in-vehicle navigation system and transmitting data to the external computing device are performed through a bi-directional interface of said remote control unit.

* * * * *